P. T. SELLERS.
CORN REPLANTER.
APPLICATION FILED FEB. 14, 1919.
1,349,920.  Patented Aug. 17, 1920.
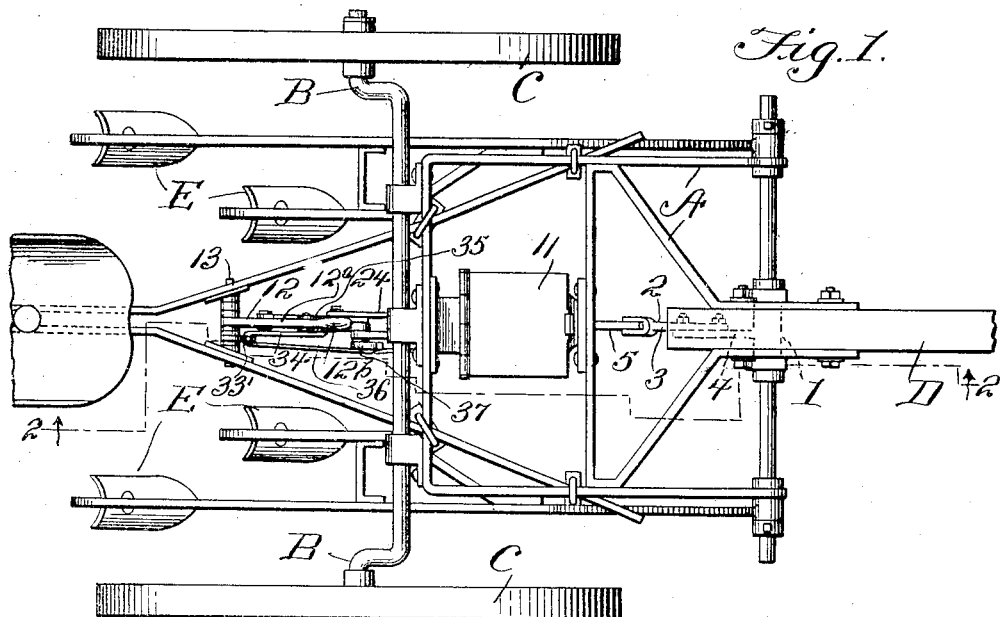
Fig. 1.
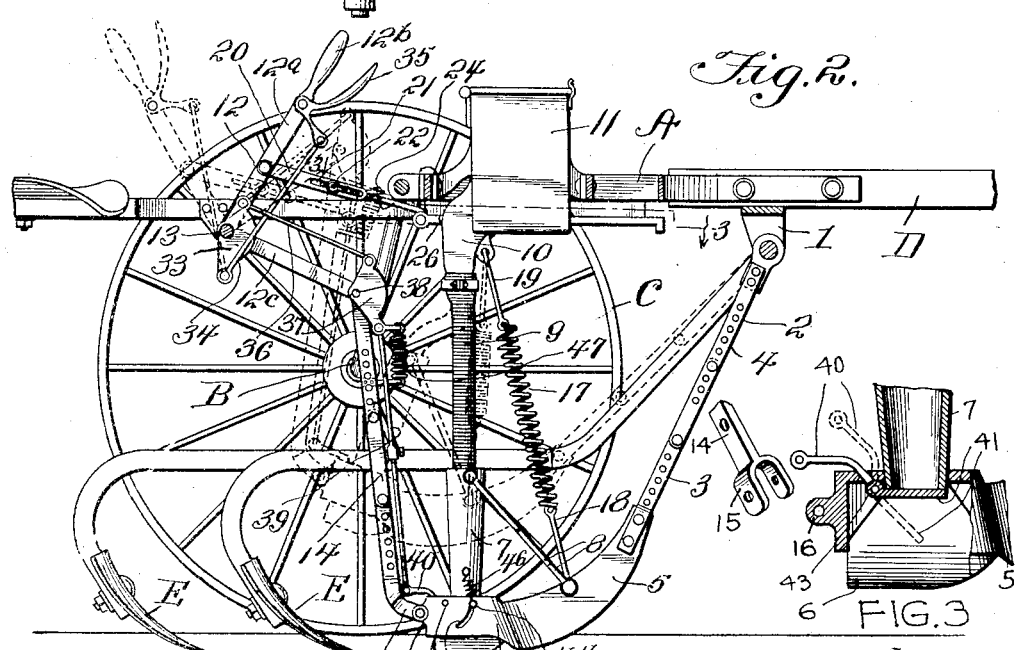
Fig. 2.
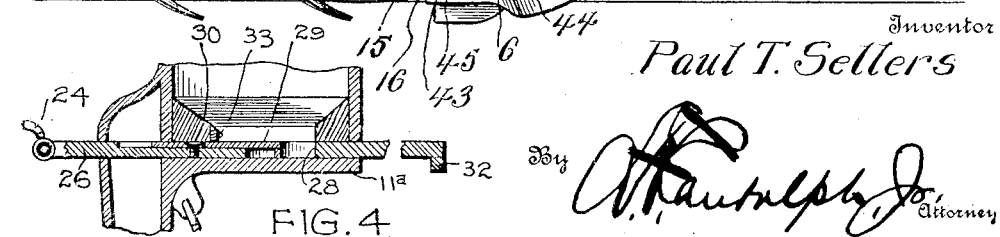
Fig. 3.
Fig. 4.
Inventor
Paul T. Sellers
By
Attorney

UNITED STATES PATENT OFFICE.

PAUL T. SELLERS, OF NICHOLASVILLE, KENTUCKY.

CORN-REPLANTER.

1,349,920.  Specification of Letters Patent.  Patented Aug. 17, 1920.

Application filed February 14, 1919. Serial No. 277,061.

*To all whom it may concern:*

Be it known that I, PAUL T. SELLERS, a citizen of the United States, residing at Nicholasville, in the county of Jessamine and State of Kentucky, have invented certain new and useful Improvements in Corn-Replanters; and I do hereby declare the following to be a full, clear, and exact description of the invention, such as will enable others skilled in the art to which it appertains to make and use the same.

This invention relates to replanting machines and more particularly to a corn replanter which is especially adapted for use in connection with a riding cultivator and one of the objects of the invention is to provide an improved means for moving the planting shoe in ground engaging position and for simultaneously operating the valve controlling the flow of feed to the planter shoe.

Another object of the invention is to provide an improved means for optionally moving the valve for controlling the dropping of the seeds from the planter shoe when the planter shoe is in planting position.

A still further object of the invention is to provide a replanting attachment for cultivators of the above character, which is durable and efficient in use, one that is simple and easy to manufacture and one which can be placed upon the market at a reasonable cost.

Further objects will appear from the detailed description.

In the drawings:

Figure 1 is a top plan view of a riding cultivator of conventional construction with a replanter constructed in accordance with my invention applied.

Fig. 2 is a section taken substantially on line 2—2 of Fig. 1 showing the replanter in side view.

Fig. 3 is a fragmentary sectional view through the lower portion of the seed chute and the planting shoe and showing the mounting of the discharge valve therein, and Fig. 4 is a fragmentary vertical section taken through the seed box.

This replanter is intended to be used in connection with a riding cultivator of any suitable or standard construction including the frame designated generally by A, axles B carrying the ground wheels C, and the draft attaching tongue D. This frame supports the usual shovel arms carrying the cultivator blades or shovels designated by E. The shovels are arranged in the usual order, in two forwardly converging series so as to thoroughly loosen and agitate the soil at each side of a row of plants along which the cultivator is drawn.

In applying my invention, an attaching block 1 is rigidly secured to the tongue D, or may be secured to any other preferred portion of the cultivator frame. The forward end of an attaching beam or pull bar designated generally by 2 is pivotally secured to this block for rocking movement about a horizontal axis. This tongue or pull bar 2 is composed of two overlapping sections 3 and 4 provided with spaced openings extending in series longitudinally thereof, these openings being adapted to be brought into register to receive securing bolts inserted therethrough. This provides means whereby the effective length of the pull bar may be readily varied to accommodate cultivators of different types. The lower end of the lower section 3 is rigidly secured to the forward end of the toe portion 5 of a planter shoe 6 of usual type, this shoe being provided at its heel portion with an upwardly projecting seed tube 7 communicating therewith. Brace rods 8 are secured to the shoe and the seed tube so as to brace this tube securely in position. In this manner, the planting shoe is connected to the cultivator so as to be rockable about a horizontal axis for movement toward and away from the ground surface.

Seed tube 7 loosely receives in its upper portion the lower portion of a downwardly tapering flexible tube 9 which is suspended from the lower end portion of the seed discharge tube 10 of a seed box 11 rigidly secured to the frame of the cultivator, tubes 9 and 10 coacting to direct seed discharge from this box into the heel portion of the planting shoe.

A bell crank lever 12 is mounted at its angle on a shaft 13 secured in the cultivator frame and extending transversely thereof, this bell crank being rockable about a horizontal axis. The upper end portion of the upper arm 12$^a$ of the bell crank is shaped to provide a hand grip 12$^b$, and the lower arm 12$^c$ of this bell crank is pivotally connected at its forward end to link 14. This link is provided at its lower end with an angularly disposed fork 15 which receives a lug 16 projecting from the rear of the shoe, this lug being pivotally secured to the fork by a pivot pin inserted through the arms thereof and the lug. A comparatively strong tension coil spring 17 has its lower end connected to the planting shoe by a rod 18, the upper end of this spring being secured to the seed discharge tube 10 of the seed box by a similar rod 19. This spring acts to normally hold the planting shoe in raised position, preferably a distance of six inches or more above the ground surface so as to prevent injury to the corn plants by the shoe during the cultivating operation. By rocking the upper arm of bell crank 12 forwardly and downwardly, the shoe may be moved into lowered position so as to enter the ground for planting in the well known manner, against the tension of spring 17. As soon as the bell crank is released, this spring acts to return the shoe to raised or inoperative position.

A forwardly projecting arm 20 is pivotally secured to the upper arm 12ª of bell crank 12. This arm is provided, in its forward end portion, with a longitudinally extending slot 21 which receives a connecting screw 22 inserted through an eye 23 provided at the rearward end of the connecting rod 24, a wing nut 25 being threaded on this screw for securing the same in adjustment longitudinally of the slot. Rod 24 is pivotally secured at its forward end to a plate valve 26 slidable in the seed box 11. This valve operates through alined openings provided in the front and back walls of the box and the seed discharge tube 10, and is slidable between the bottom 11ª and a guide frame designated generally by 27 mounted within the seed box above the valve so as to form a substantially rectangular central opening for supplying the seed to the valve. This valve plate is provided with a longitudinal seed opening 28 the effective size of which is regulated by a regulating plate 29 slidable in a recess provided in the upper face of the valve, this plate being secured in adjustment by a screw 30 threaded into the body of the valve and operable through a slot 31 in plate 29, this slot being shaped to snugly receive the head of the screw, as shown. In this manner, the effective size of the seed receiving opening of the seed control valve may be readily varied so as to accommodate a greater or a less number of seeds, as desired. The seed opening of the plate is so positioned that, when the bell crank lever is rocked rearwardly and the planting shoe is held raised by spring 17, the valve plate will be moved rearwardly so as to discharge the seed from the seed receiving opening thereof into the seed discharge tube 10. Complete withdrawal of this plate from the seed box is prevented by a downwardly directed shoulder 32 formed at the forward end of the plate for engagement with the front wall of the box. A wiping strip 33 of rubber or other suitable material is carried by the rearward bar of the frame 27 and is positioned to remove all surplus seed from the top of the plate adjacent the seed receiving opening when the valve plate is moved rearwardly thus preventing binding or jamming of the plate and consequent injury to the seed while insuring accuracy of operation.

A segmental connecting plate 33 is rockably mounted on the shaft 13 adjacent the bell crank lever 12. The upper corner of this plate is connected by a connecting rod 34 to the lower end of a latch lever 35 rockable on the upper arm 12ª of the bell crank, and the lower corner of this plate is connected by a rod 36 to the upper corner of a similar plate 37 rockably mounted on a pivot pin 38 securing the adjacent end of the lower arm 12ᵇ of the bell crank and the link 14 together, which is extended for this purpose. The lower corner of plate 37 is connected by a rod 39 to a substantially L-shaped arm 40 of a seed discharge valve 41 operable in the heel of the shoe. This valve is provided, at its rearward end, with spaced upwardly directed ears 42 which receive a pivot pin 43 by means of which the valve is rockably mounted in the shoe adjacent the lower end of the seed tube 7 of the shoe. The valve is further provided, at its forward end, with a laterally projecting finger 44 which extends through a slot 45 formed through the wall of the shoe concentric with head 43. A tension spring 46 is secured at its lower end to this finger and at its upper end to the seed tube 7. This spring acts to normally hold the valve 41 in raised position so as to close the tube and prevent passage of seed therefrom into the heel of the shoe.

In practice, the shoe is normally held in raised position by the tension spring 17 so as to clear the plants which are being cultivated and eliminate danger of injury thereto. When the operator sees a vacant hill, the bell crank lever is swung downwardly and forwardly so as to move the shoe into planting position, the hand latch being then rocked so as to rock the valve 41 into open position thus discharging the seed from tube 7 into the ground at the proper position to replant the hill in question. When the bell crank lever is released, the planting shoe is returned to inoperative position, the plate valve 26 being moved rearwardly so as to discharge a new batch of seed into the tube 7, these seeds being collected upon the upper surface of valve 41. It will be understood, of course, that the hand latch is released preliminary to releasing the bell crank lever so as to permit return of the discharge valve to closed position, this return of the valve being effected by the action of the tension spring 46 connected to the valve, and a tension spring 47 which is secured to the segmental plate 37 adjacent the lower corner thereof and to the link 14. The corn or other grain which has thus been planted will be covered by the action of the cultivator shovels, it being understood that the shoe is positioned in advance of and midway between the forward pair of shovels, as shown. In this manner, the vacant hills of a corn field may be readily replanted simultaneously with the first cultivating operation thus effecting a material saving in time and labor.

It will be evident that there may be slight changes made in the construction and arrangement of the details of my invention without departing from the field and scope of the same, and I intend to include all such variations, as fall within the scope of the appended claims, in this application in which a preferred form only of my invention is disclosed.

What I claim is:

1. In a planting mechanism of the character described, a planting shoe, means for attaching said shoe to a cultivator for movement toward and away from the ground surface, a seed box adapted to be secured to a cultivator frame, connections between said box and the shoe for holding the shoe in raised position when the box is secured to a cultivator frame, a bell crank lever mounted for rocking movement about a horizontal axis, a link pivotally secured to the forward end of the lower arm of the bell crank lever and having its lower end pivoted to said shoe for moving the shoe downwardly into planting position when the lower arm of said lever is swung downwardly and rearwardly, means for conducting seed from the seed box to the seed tube of the planting shoe, a valve operable in the seed box, a seed discharge valve acting to normally close the seed tube of said shoe, connections between the valve of the seed box for operating said valve so as to discharge seed from said box when the shoe is raised into inoperative position, and means carried by said lever and link and connected to the seed discharge valve for optionally discharging seed from the seed tube of the shoe.

2. The combination with a cultivator, of a planting shoe attached thereto for movement toward and away from the ground surface, means for normally holding said shoe in raised position, the shoe being provided with a seed tube, means for supplying seed to said tube when the shoe is moved into raised position, means for lowering said shoe into planting position, a valve acting to normally close the seed tube of the shoe, and means for optionally moving said valve into open position so as to discharge seed from said tube when the planting shoe is in planting position.

In testimony whereof I affix my signature in presence of two witnesses.

PAUL T. SELLERS.

Witnesses:
AGNES BLACKFORD,
Mrs. J. S. COLE.